United States Patent
Geery

(10) Patent No.: US 7,303,166 B2
(45) Date of Patent: Dec. 4, 2007

(54) HIGHLY MANEUVERABLE POWERED AIRSHIP

(76) Inventor: Daniel Geery, 1987 S. McClelland St., Salt Lake City, UT (US) 84105

( * ) Notice: Subject to any disclaimer, the term of this patent is extended or adjusted under 35 U.S.C. 154(b) by 50 days.

(21) Appl. No.: 10/980,944

(22) Filed: Nov. 4, 2004

(65) Prior Publication Data
US 2005/0263642 A1 Dec. 1, 2005

Related U.S. Application Data

(60) Provisional application No. 60/517,056, filed on Nov. 4, 2003.

(51) Int. Cl.
B64B 1/36 (2006.01)
(52) U.S. Cl. ...................................... 244/30
(58) Field of Classification Search ................. 244/24, 244/29, 30, 125, 126, 31
See application file for complete search history.

(56) References Cited

U.S. PATENT DOCUMENTS

| 23,163 | A | | 3/1859 | Gage |
| 43,419 | A | | 7/1864 | McDougall |
| 77,850 | A | | 5/1868 | Stone |
| 152,414 | A | | 6/1874 | Rhone |
| 250,417 | A | * | 12/1881 | Blackman ................ 244/30 |
| 280,914 | A | | 7/1883 | De Souza |
| 344,718 | A | | 6/1886 | Campbell et al. |
| 510,492 | A | | 12/1893 | Sumovski |
| 1,180,366 | A | | 4/1916 | Asbury |
| 1,324,961 | A | | 12/1919 | Grantham |
| 1,715,829 | A | * | 6/1929 | Geisler ................ 244/125 |
| 1,806,316 | A | * | 5/1931 | Thayer ................ 244/24 |
| 1,818,138 | A | | 8/1931 | Howland |
| 1,827,548 | A | | 10/1931 | Studer |
| 1,852,680 | A | | 4/1932 | Shaw |
| 1,855,695 | A | | 4/1932 | Snyder |
| 2,081,868 | A | | 5/1937 | Hampden |
| 2,108,093 | A | | 2/1938 | Zimmerman |
| 2,430,820 | A | | 11/1947 | Lightfoot |
| 2,826,001 | A | | 3/1958 | Presnell |
| 3,157,145 | A | | 11/1964 | Farris et al. |
| 3,288,397 | A | * | 11/1966 | Fitzpatrick ................ 244/29 |
| 3,547,063 | A | | 12/1970 | Follett |
| 3,613,615 | A | | 10/1971 | Sturm |
| 3,677,212 | A | | 7/1972 | Gregoire |
| 3,974,989 | A | * | 8/1976 | Goodfellow ................ 244/126 |
| 4,261,534 | A | | 4/1981 | Roseli |
| 4,364,532 | A | * | 12/1982 | Stark ................ 244/30 |
| 4,750,690 | A | * | 6/1988 | Conn ................ 244/126 |
| 4,773,617 | A | * | 9/1988 | McCampbell ................ 244/24 |
| 5,090,636 | A | | 2/1992 | Sadowski |
| 5,285,986 | A | * | 2/1994 | Hagenlocher ................ 244/97 |
| 5,351,911 | A | | 10/1994 | Neumayr |
| 5,425,515 | A | | 6/1995 | Hirose |

(Continued)

Primary Examiner—Timothy D. Collins
(74) Attorney, Agent, or Firm—TraskBritt

(57) ABSTRACT

A highly maneuverable powered airship is disclosed. The powered airship may include an exterior shell having a front portion, a rear portion and a main axis; the exterior shell may be configured with an aspect ratio greater than or equal to 9:1. The powered airship may further include a motor powered by an energy source, the motor mounted to the rear portion of the exterior shell and configured for selectively providing thrust parallel to the main axis and in any direction up to 90° relative to the main axis. A solar-assisted, electrically powered airship and propeller assembly are also disclosed.

24 Claims, 4 Drawing Sheets

U.S. PATENT DOCUMENTS

| | | |
|---|---|---|
| 5,518,205 A | 5/1996 | Wurst et al. |
| 5,810,284 A | 9/1998 | Hibbs et al. |
| 5,865,662 A | 2/1999 | Dammann |
| 5,906,335 A * | 5/1999 | Thompson .................... 244/96 |
| 6,010,093 A * | 1/2000 | Paulson ....................... 244/24 |
| 6,045,089 A | 4/2000 | Chen |
| 6,189,829 B1 * | 2/2001 | Brotz .......................... 244/30 |
| 6,224,016 B1 * | 5/2001 | Lee et al. ..................... 244/30 |
| 6,305,641 B1 * | 10/2001 | Onda .......................... 244/30 |
| 6,371,409 B1 * | 4/2002 | Steele ......................... 244/30 |
| 2001/0002686 A1 * | 6/2001 | Yokomaku et al. ........... 244/30 |
| 2002/0005457 A1 * | 1/2002 | Lee et al. ..................... 244/30 |

\* cited by examiner

HIGHLY MANEUVERABLE POWERED AIRSHIP

CROSS-REFERENCE TO RELATED APPLICATION

Pursuant to 35 U.S.C. § 119(e), this nonprovisional patent application claims benefit and priority to U.S. Provisional Patent Application Ser. No. 60/517,056, filed Nov. 4, 2003, titled: SOLAR POWERED AIRSHIP.

BACKGROUND OF THE INVENTION

1. Field of the Invention

The present invention relates to powered airships. More particularly, the present invention relates to a highly maneuverable, highly streamlined, light-as-air vehicle that may be powered by a variety of propulsion systems and sources of energy.

2. State of the Art

Long before the Wright brothers' first flight, man has sought to create improved vehicles of flight. From primitive hot air balloons to supersonic jets and reusable spacecraft, the technology of flight is varied and ever-changing. Across this broad spectrum of aircraft technology, however, one factor remains constant. Every airship needs a source of energy to propel the craft through the atmosphere. The traditional energy source is some form of hydrocarbon fuel. Of course, other types of fuels are also used, but in each case, the fuel is eventually spent and the craft must return to the earth for refueling.

In addition, the constant pull of gravity makes it particularly challenging to design and build aircraft with precise maneuverability. Of course, precise maneuverability of aircraft is well known, such as with fighter jets or helicopters, but this maneuverability is obtained largely through powerful, costly engines and complicated flight control systems. Moreover, such maneuverability is generally not accomplished in a confined area, but instead requires significant airspace.

The idea of powering an aircraft using solar energy is not new. U.S. Pat. No. 6,045,089 to Chen discloses an airplane having solar cells that receive solar energy redirected from a satellite in planetary orbit to the surface of the airplane. The aircraft also contains an energy storage device for storing excess energy generated from the redirected rays from the sun. However, the size of such an aircraft having solar cells capable of receiving redirected solar energy from an orbiting satellite is too large for precise maneuverability and is also limited to flying at extremely high altitudes. U.S. Pat. No. 5,810,284 to Hibbs et al., discloses another solar powered aircraft. But, like the Chen apparatus, this aircraft is also limited to high altitudes and is too large for precise movements. In a preferred embodiment, the Hibbs et al. aircraft has a wing span of 200 feet, which makes the aircraft far too large for operating in small areas.

Thus, there are many aircraft applications that would be enhanced by a light-weight, highly maneuverable airship. For example, such an airship could be used for remote monitoring of earth-based events at a close distance. An aircraft with these characteristics could be used for photography, advertising, surveillance, sports coverage, rescue guidance and a host of other applications. It would be particularly useful to have such an airship with a constant energy source that does not require refueling. Moreover, such an airship powered by solar energy would have negligible fuel costs, would not pollute, would have low maintenance and because it could employ an electric motor for an engine, would be extremely quiet.

Accordingly, there exists a need in the art for a light-weight airship with precise maneuverability. There further exists a need in the art for an aircraft that can operate in a smaller airspace than that required by conventional aircraft. There exists a further need for an airship that is safe and does not pollute.

BRIEF SUMMARY OF THE INVENTION

The present invention provides a powered airship. Embodiments of the powered airship of the present invention include a highly articulated, rear mounted motor capable of maneuvering the airship for rapid turning. An embodiment of the present invention provides a light-weight solar-assisted electrically powered airship powered by the sun that does not require refueling and can stay aloft for sustained periods of time. Furthermore, the present invention relates to a highly maneuverable airship that can be precisely controlled within a much smaller airspace than conventional aircraft.

A powered airship is disclosed. The powered airship may include an exterior shell having a front portion, a rear portion and a main axis, the exterior shell configured with an aspect ratio greater than or equal to 9:1. The powered airship may further include a motor powered by an energy source, the motor mounted to the rear portion of the exterior shell and configured for selectively providing thrust parallel to the main axis and in any direction up to 90° relative to the main axis. A solar-assisted, electrically powered airship and propeller assembly are also disclosed.

The foregoing advantages and characterizing features will become apparent from the following description of certain illustrative embodiments of the invention. The above-described features and advantages of the present invention, as well as additional features and advantages, will be set forth or will become more fully apparent in the detailed description that follows and in the appended claims. The novel features that are considered characteristic of this invention are set forth in the attached claims. Furthermore, the features and advantages of the present invention may be learned by the practice of the invention, or will be obvious to one skilled in the art from the description, as set forth hereinafter.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION OF THE INVENTION

The present invention relates to a powered aircraft. More particularly, embodiments of the present invention relate to a highly maneuverable, light-weight airship. The airship can be used in smaller spaces where traditional craft are unable to operate with precise movement. The airship's maneuverability is achieved through a propeller axle that rotates 60° or more in any direction so as to provide thrust in various directions in order to control the position of the airship. The propeller may also be reversed to provide reverse thrust maneuverability along with the angled propeller axle feature according to yet another embodiment of the present invention.

It is understood that the terminology used herein is used for the purpose of describing particular embodiments only and is not intended to limit the scope of the present invention. It is also understood that, as used herein and in the appended claims, the singular forms "a," "an," and "the" include plural reference, unless the context clearly dictates otherwise.

Unless defined otherwise, all technical and scientific terms used herein have the same meanings as commonly understood by one of ordinary skill in the art to which this invention belongs. While various methods, compositions, and materials of the present invention are described herein, any methods and materials similar or equivalent to those described herein may by used in the practice or testing of the present invention. All references cited herein are incorporated by reference in their entirety and for all purposes.

Figure 1:
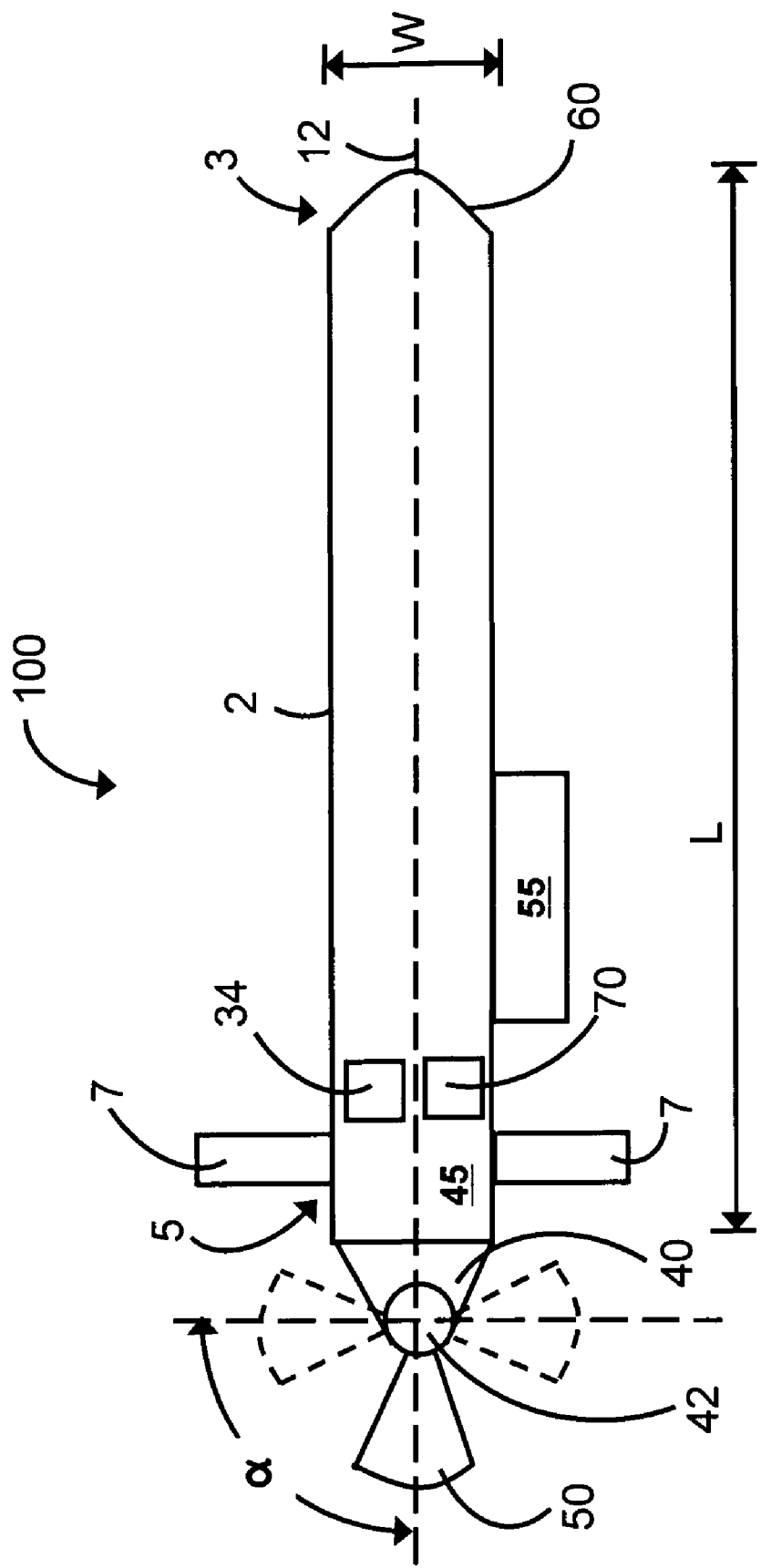
FIG. 1 illustrates a side view of an embodiment of a powered airship according to the present invention.

FIG. 1 is a side view of an embodiment of a powered airship 100 according to the present invention. Powered airship 100 may include an exterior shell 2 having a front portion 3, a rear portion 5 and a main axis 12. According to an embodiment of the powered airship 100, the exterior shell 2 may be configured with a length to width ratio (L:W) greater than or equal to 9:1 (hereinafter referred to as an "aspect ratio"). Powered airship 100 may further include a motor 50 powered by an energy source 45 according to the embodiment illustrated in FIG. 1. The motor 50 may be mounted to the rear portion 5 of exterior shell 2.

A particular advantage of the powered airship 100 (and other embodiments such as airships 200 and 300 discussed below) is that it may be configured for selectively providing thrust along or parallel to the main axis 12 and in any direction, see angle of thrust α, up to 90° relative to main axis 12. By driving the powered airship 100 from the rear portion 5 at high angles of thrust α, the airship 100 needs little airspace to turn and can effectively turn in place. The motor 50 may be operably connected to the powered airship 100 through a motor mount assembly 40 that provides a highly articulated and maneuverable angle of thrust α. Motor mount assembly 40 may include a ball joint mechanism 42 or any other mechanical system suitable for selectively adjusting the angle of thrust α, according to the principles of the present invention.

Another advantageous feature of powered airship 100 is that the front portion 3 of the exterior shell 2 may be shaped 60 with a curve providing relatively constant incremental pressure drag according to embodiments of the present invention. For example, according to two embodiments of the powered airship 100, the shape 60 may comprise a catenary, tractrix curve or similar curve. Such curves and their features and advantages are known to one skilled in the art of mathematics.

The exterior shell 2 may be formed of a flexible material such as Heptax™ film Oracover™ film or any other helium retentive material according to embodiments of the present invention. The flexible material may be a transparent plastic film according to another embodiment. Alternatively, another embodiment of the powered airship 100 may include an exterior shell 2 formed of a substantially rigid material. The substantially rigid material may be carbon fiber or any other suitably light weight material consistent with the principles of the present invention.

The motor 50 may comprise any suitable means for propulsion through the air. For example, motor 50 may be a rocket motor, a jet engine, a gasoline engine or a diesel engine according to embodiments of the present invention. Such motors and engines would require a hydrocarbon-based energy source or fuel and storage for same as known to those skilled in the art. Alternatively, motor 50 may comprise an electrical motor powered by an energy source 45 and configured for driving a propeller 20. The energy source 45 may be a fuel cell, an alkaline battery, a nickel cadmium battery, a lithium ion battery or a lithium polymer battery according to embodiments of the present invention. Powered airship 100 may further include a solar array (not shown in FIG. 1, but see FIGS. 2-3) for charging the energy source 45.

Powered airship 100 may further include a means for remotely controlling speed, elevation and position of the powered airship. For example, powered airship 100 may include a flight controller 70 in communication with a receiver 34 configured for remotely controlling the powered airship 100 through signals transmitted from the ground or elsewhere. Powered airship 100 may include one or more stabilizing fins 7 for stability.

Powered airship 100 may further include a means for carrying a payload 55 according to an embodiment of the present invention. The means for carrying a payload 55 may include a gondola configured for carrying one or more passengers. Alternatively, powered airship 100 may include a payload 55 comprising one or more of scientific equipment, communications equipment or surveillance equipment according to embodiments of the present invention. The payload 55 may be configured for transportation from one ground location to another ground location, automatically or under remote control.

Figure 2:
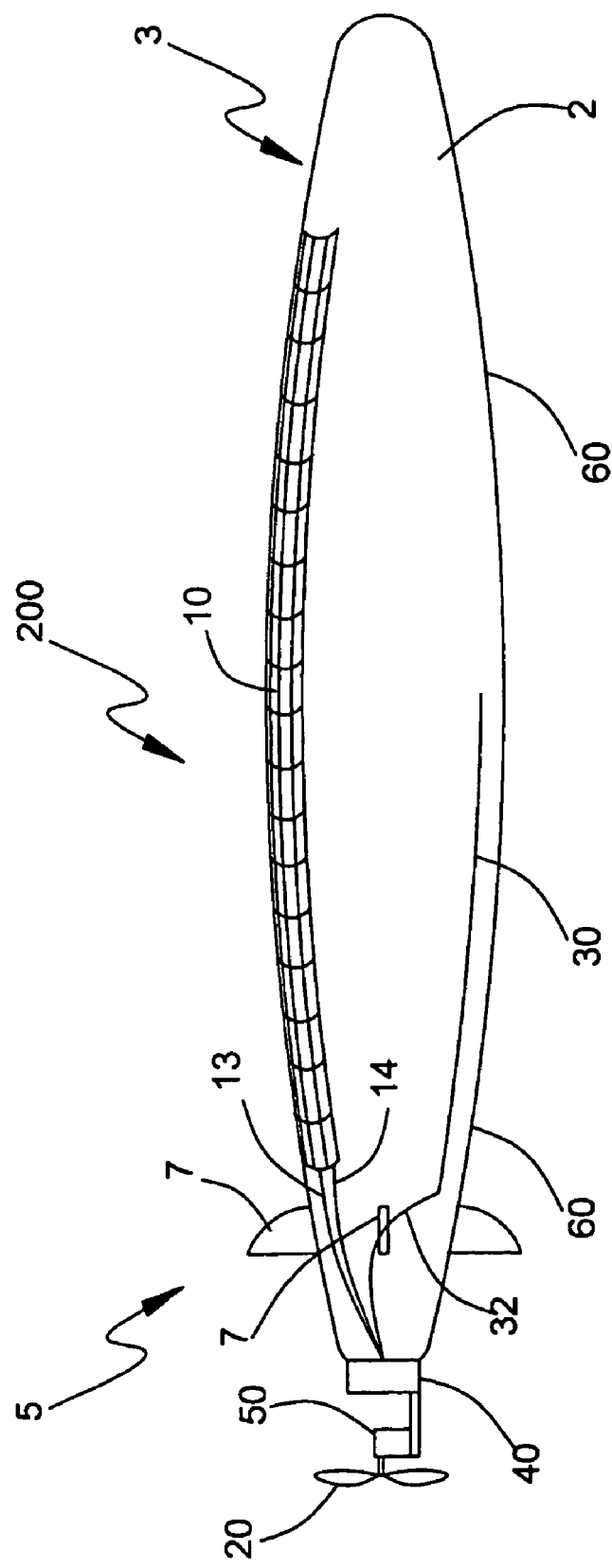
FIG. 2 is a side view illustrating a solar-assisted, electrically powered airship according to an embodiment of the present invention.

FIG. 2 illustrates a side view of an embodiment of a solar-assisted, electrically powered airship 200 (hereinafter "airship 200") having a front portion 3 and a rear portion 5 according to the present invention. The airship 200 comprises an exterior shell 2 that provides shape to the airship 200 and also houses or supports various components. Generally, the exterior shell 2 is comprised of a light-weight, flexible material. In order to minimize air turbulence, the exterior shell 2 should have a generally smooth outer surface. In a presently preferred embodiment of the invention, the airship 200 has a thin, columnar configuration, unlike a traditional airship. In a further presently illustrated embodiment of the invention, the airship 200 has an aspect ratio of 9:1 or higher; e.g., 12:1. That is, the length to diameter of the airship 200 is approximately nine to one. This aspect ratio overcomes many of the problems associated with prior art lighter than air vehicles, namely drag against forward movement and maneuverability. The airship 200 of the present invention is significantly faster for the same amount of thrust power than prior art airships, such as blimps, and is highly maneuverable and very quick to respond to thrust direction changes resulting in relatively sharp turning ability. The airship 200 includes a curved front portion 3 and a curved rear portion 5. The shape 60 of the front and rear portions 3 and 5, respectively, which extend from proximate a center portion of the airship 200 to the distal and proximal ends, respectively, may include a catenary, tractrix, or similar curves providing relatively constant incremental pressure drag according to embodiments of the present invention. That is, at a given longitudinal position along the outer surface of the shell 2, the diameter is proportional, to some extent, to the angle of the surface relative to the longitudinal axis of the airship 200. Thus, nearer the distal end, the surface drag is reduced since the diameter of the airship 200 is smaller. Where the diameter is larger, e.g., near the center portion, the angle of attack of the outer shell 2 is reduced relative to the longitudinal axis. This shape 60 of the airship 200 in combination with the position of the drive propeller 20, results in an airship 200 capable of substantial efficiency in distance traveled per watt of power. For example, the present invention having an outer shell length of about sixteen feet, can travel 12 miles per hour on 0.5 amps at 7.2 volts or 3.3 miles per watt of electrical power. According to alternative embodiments, the airship 200 may have a "saucer" or "guitar pick" shape with a similar aspect ratio.

As shown in the embodiment of FIG. 2, there are four stabilizing fins 7 (three of which are visible) located in the rear portion 5 of airship 200, that are radially positioned at ninety degree intervals around the rear of the shell 2. The stabilizing fins 7 may have any suitable shape, e.g., fish-like, fins according to the present invention. However, one of ordinary skill in the art will appreciate that there are many possible fin configurations that provide sufficient stability for the airship 200 during flight, e.g., 2 fins, 3 fins, 5 fins, 6 fins, etc., spaced at various regular or varying radial intervals. In addition, the rear portion 5 of the airship 200 comprises a motor mount assembly 40, which further comprises a motor 50 and a propeller 20. To counterbalance the weight of these components, the airship 200 may also include a ballast 9 (shown in FIG. 3) generally located in the front portion 3 of the airship 200. According to other embodiments, a payload may serve the purpose of ballast 9. The motor mount assembly 40, including motor 50 and propeller 20, may be generally positioned in-line with the main axis 12 of airship 200.

According to the illustrated embodiment, the motor 50 may be powered by a light-weight solar array 10, which has positive and negative leads 13 and 14, respectively, that connect to the motor 50 in concert with the energy source 45 (FIG. 1). The solar array 10 may be located either inside or outside of exterior shell 2. If the solar array 10 is located on the inside of exterior shell 2, then the exterior shell 2 should be comprised of a clear or translucent material that allows sunlight to penetrate the airship 200 and be collected by solar array 10. Conversely, the solar array 10 may be located on the outside of exterior shell 2. In the present embodiment of the invention, solar array 10 is located inside exterior shell 2 and is comprised of flexible Iowa thin film solar panels that operate at 7.2 volts. The use of 7.2 volt power solar panels is, of course, merely exemplary. Other voltages and suitable power sources for the motor 50 may be provided in addition to or in replacement of the solar panels 10, such as energy source 45 or other source of electrical energy.

For example, in low light conditions or when the airship is turned away from the sun, a secondary power source, such as fuel cells, lithium-ion batteries, lithium polymer batteries or other forms of batteries known in the art may be used to provide electrical power when the solar panels are not being charged by the sun. Thus, the airship 200 may be provided with a dual power source. Such fuel cells or batteries may be charged by the solar panels when they are receiving sunlight in order to provide power when sunlight is not available to the solar panels. Such alternative power sources may also be positioned below the center of gravity of the air ship, so as to provide a horizontally orienting ballast to the airship during flight. Of course a payload may also be used as ballast according to an embodiment of the present invention.

According to another embodiment of the present invention, light weight, impermeable gas bags may be filled with any gaseous substance lighter than air and placed inside exterior shell 2 of the airship 200 to provide lift. If the solar array 10 is located within the airship 200, then the gas bags, like exterior shell 2, should be made of a clear, translucent material that will allow sunlight to penetrate through the gas bags and onto solar array 10. In yet another embodiment, the exterior shell 2 may be air tight and filled with lighter than air gas, such as helium, to provide lift for the airship 200.

Airship 200 may further include an antenna 30 connected to antenna wire 32 for receiving signals from a remote operator. Such signals may be remote control (RC) type signals using radio frequencies when the airship 200 is being remotely controlled using, for example, a radio control device. By way of a signal sent by the remote operator and received by the antenna 30, the airship 200 can be maneuvered and utilized in accordance with the above-stated designs for the present invention.

If the airship 200 is manned according to another embodiment of the present invention, a control cockpit or structure may be included in the airship 200 in a manner similar to conventional airships, or embedded in the airship and surrounded by transparent material that would enable passengers or a pilot to see out. Controls for maneuvering the airship 200 may also be provided in the cockpit.

It is further contemplated that larger scale airships could be used to transport cargo or other items where remote access by air is typically difficult according to additional embodiments of the present invention. Larger scale airships may also be used to transport passengers. Such delivery of goods or passengers could be remotely controlled through GPS positioning, ham radio and/or ATV in such a manner that coordinates are programmed into the airship's computer and the airship automatically flies to the pre-selected location, drops the goods and automatically returns to the point of origin or another designated location.

Smaller versions of the airship 200 provided with power by a lightweight battery could be used as an indoor advertising airship with more speed and control than present indoor airships. It should be apparent that the scale or size of the airship 100, 200 may be arbitrarily large or small depending on the application. Airship 100, 200 may be used as a satellite for communications or for relaying other electromagnetic signals such as those for television.

Figure 3:
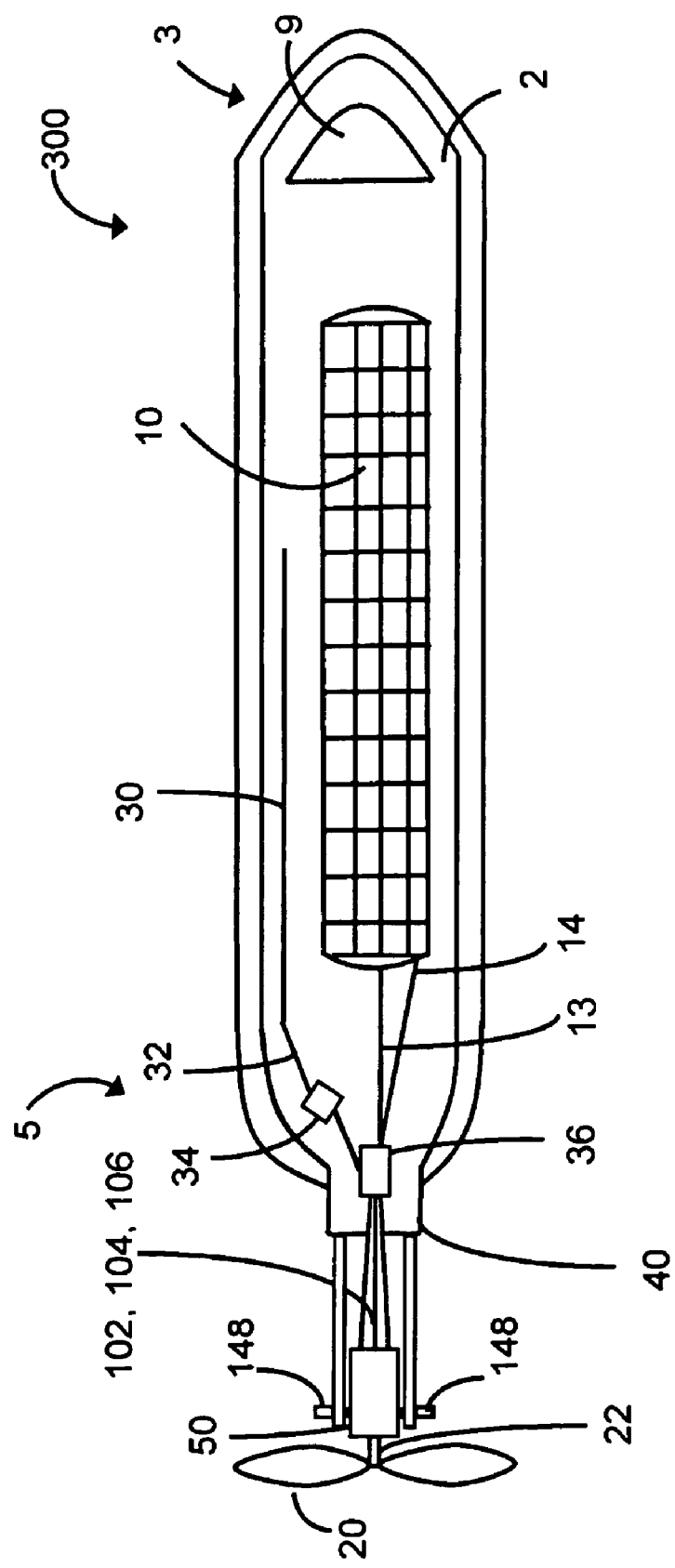
FIG. 3 is a top view illustrating an inside of an airship according to another embodiment of the present invention.

FIG. 3 shows a top view of an inside of an airship 300. As can be seen in the embodiment of the invention shown in FIG. 3, solar array 10 is located inside exterior shell 2. Located generally in the front portion 3 of airship 300 is ballast 9, which serves to counterbalance the weight of components, located in the rear portion 5 of airship 300. A payload may also serve the function of ballast 9 according to other embodiments of the present invention. Further shown in FIG. 3 is a receiver 34, which receives the signal from antenna 30 sent by the remote operator for controlling the aircraft. In addition, there is a speed controller 36 that is powered by solar array 10 and is connected thereto via the positive and negative leads 13 and 14. Although the speed controller 36, the antenna 30, the solar array 10 and the receiver 34 are shown located inside exterior shell 2, these components can also be placed on the outside of exterior shell 2. The solar array 10 is positioned on the bottom interior surface of the shell 2, with the shell 2 formed from a transparent material to allow sunlight to penetrate the exterior shell 2 and charge the solar array 10. Thus, the solar array 10 acts as a ballast to maintain the lateral orientation of the airship 300 during flight. If these components are located on the outside of exterior shell 2, they should be securely attached to the airship 300, such that reliable operation of airship 300 is ensured and also so that air turbulence on the outside of the vessel is minimized.

Figure 4:
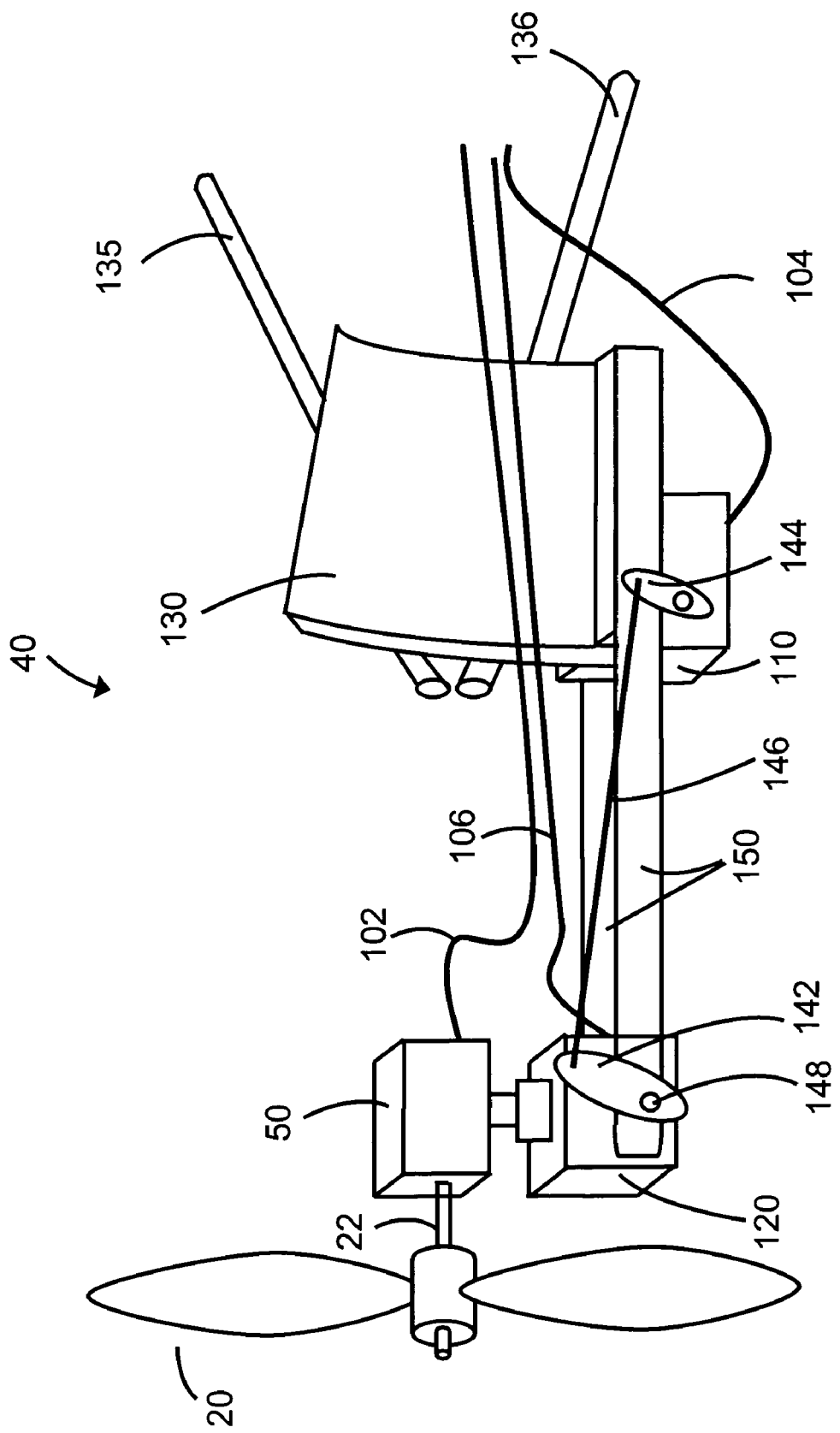
FIG. 4 shows a side perspective of a motor mount assembly of an embodiment of the present invention.

FIG. 4 shows one embodiment of motor mount assembly 40 of the present invention. Motor mount assembly 40 comprises a wedge block 130 having wedge block arms 135 and 136 that form an angled opening moving away from wedge block 130. Wedge block arms 135 and 136 are preferably made of a semi-flexible material having enough bend to allow the arms to be momentarily squeezed together and inserted into exterior shell 2 of the airship 300 (see FIG. 3). After inserting wedge block arms 135 and 136 into the airship 300, the arms will bias open and hold the motor mount assembly 40 against the inside of rear portion 5 of the airship 200 or airship 300. Of course, other methods of attaching motor mount assembly 40 to the airship are equally applicable to the present invention, including hooks, straps, and other devices and methods of releasable attachment. For example, the arms 135 and 136 may be affixed, as with tape or other bonding material, to the exterior surface of the exterior shell 2. Motor mount assembly 40 may be formed of carbon fiber or other suitable material. It is further contemplated that an internal frame could be used on larger ships to support the motor.

As shown in FIG. 4, motor mount assembly 40 further comprises support arms 150, which extend in a parallel fashion out from wedge block 130 moving away from wedge block arms 135 and 136. Mounted on the distal ends of support arms 150 are vertical rotation rods 148, which rotate about an axis perpendicular to support arms 150. Horizontal servo 120 is rotatably connected to vertical rotation rods 148. Motor 50 is operably affixed to horizontal servo 120 such that horizontal servo 120 can turn motor 50 back and forth in a horizontal motion relative to horizontal servo 120. Motor lead wire 102 and horizontal servo wire 106 are operably connected to the receiver 34 and speed controller 36 (see FIG. 3) such that the remote operator of the airship 300 can selectively control the speed of motor 50 and its horizontal movement in relation to horizontal servo 120. Operably connected to motor 50 is propeller shaft 22 and propeller 20.

Vertical servo 110 is affixed to the bottom of wedge block 130 and comprises vertical servo linkage 144, which is operably connected via connecting arm 146 to horizontal servo linkage 142, which is operably connected to vertical rotation rods 148. A signal is transmitted from the remote operator and sent via vertical servo wire 104 to vertical servo 110. On command from the remote operator, vertical servo 110 operates through vertical servo linkage 144, connecting arm 146 and horizontal servo linkage 142 to rotate horizontal servo 120, motor 50, propeller shaft 22 and propeller 20 in a vertical movement relative to the support arms 150.

Through the horizontal and vertical motion associated with horizontal servo 120 and vertical servo 110, propeller 20 can be rotated and turned at least 60° in any direction. It is important to the operation of the invention that support arms 150 be long enough to allow 60° or more rotation of propeller 20 in any direction without the propeller 20 striking wedge block 130, exterior shell 2 or any other portion of airship 200, 300.

Given the extreme range of motion of the motor mount assembly 40 of the present invention, it is possible to turn the airship about an extremely short radius, where the airship 200 virtually pivots about a point in space. This unique characteristic is attributable in part to the novel combination of rear thrust from the propeller 20 and the extension of the propeller 20 out from the body of the airship 200 along support arms 150. With this novel configuration, the propeller 20 can be turned to propel airship 200 in any direction without the blades striking the aircraft. Thus, the propeller 20 has four independent degrees of freedom, two in a vertical plane and two in a horizontal plane resulting in a wide range of thrust angles for the propeller 20. Even greater turning and steering characteristics are available when exterior shell 2 comprises flexible material. When the airship is sharply turned, a flexible exterior shell allows partial folding of airship 200 such that motor mount assembly 40 and rear portion 5 adjust to the new direction of travel before front portion 3. However, according to the present invention, there must be enough rigidity in exterior shell 2 that front portion 3 is realigned with the linear axis of airship 300 before motor mount assembly 40 drives into the sides of airship 300. The propeller 20 is also capable of rotating in reverse as directed by the motor in order to move the airship 300 in a reverse direction. The arrangement of the propeller axle in line with the longitudinal axis of the airship greatly increases the efficiency of the airship, particularly in comparison to traditional airships or airships where the propeller alignment causes an adverse lever-arm effect against forward movement of the vehicle (much like paddling along the side of a canoe creates unwanted lateral movement).

The following is a description of one embodiment of the present invention. This embodiment is set forth by way of example only and is not meant to limit other embodiments falling within the scope of the present invention. In this embodiment, exterior shell 2 of airship 200 (see FIG. 2) encases a gas bag comprised of Heptax™ panels, manufactured by Gunzi Corporation of Japan with the panels being seamed by heat, glue, tape and treated with Hi-Float™, which is a commercial balloon sealant manufactured by The Hi-Float Co., Inc., 13025 Middletown Industrial Blvd., Louisville, Ky. 40223. The airship 200 is approximately 16 feet long, 21 inches in diameter and comprises tapered ends on front portion 3 and rear portion 5. Airship 200 comprises three fins 7 spaced equidistant from each other and located in the rear portion 5 of airship 200. In this embodiment of the invention, solar array 10 is located inside the gas bag (not shown), although it could also be located outside the gas bag yet inside exterior shell 2 or, as discussed above, outside exterior shell 2. Solar array 10 can be any commercial, light-weight solar panel, but is preferably a flexible Iowa Thinfilm™ panel that operates at 7.2 volts. These panels are distributed by Iowa Thin Film Technologies, Inc., 2337 230th Street, Boone, Iowa 50036. Speed controller 36 is a standard device available from hobby shops. Propeller 20 is a 10-inch, 80 pitch light-weight hobby, propeller. The horizontal servo 120 and vertical servo 110 are HiTeC™ HS-55 micro servos having a three pole ferrite motor weighing approximately 0.28 ounces. HiTec™ servos are commercially available from Hitec RCD USA, Inc., 12115 Paine St., Poway, Calif. 92064. In this preferred embodiment of the invention, support arms 150 are approximately 4 inches in length.

The present invention may be embodied in other specific forms without departing from its spirit or essential characteristics. For example, new or different materials that are already or will be developed or invented in the future may be used to replace or improve materials described with reference to the present invention (e.g., better carbon fiber composites, new film laminates, and power sources that may improve the structure and/or performance of the present invention). It is further contemplated that cell phone technology could be employed for remote control of the airship. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

While the foregoing advantages of the present invention are manifested in the illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A powered airship, comprising:
   an exterior shell having a front portion, a rear portion and a main axis, the exterior shell configured with an aspect ratio greater than or equal to 9:1;
   a motor powered by an energy source, the motor mounted to the rear portion of the exterior shell and configured for selectively providing thrust parallel to the main axis and in any direction up to 90° relative to the main axis;
   a first servo configured for rotating the motor in a first plane about a first axis orthogonal to the main axis; and
   a second servo configured for rotating the motor and the first servo in a second plane about a second axis orthogonal to the first axis and the main axis.

2. The powered airship according to claim 1, wherein the front portion of the exterior shell comprises a shape providing relatively constant incremental pressure drag.

3. The powered airship according to claim 2, wherein the shape is a catenary or tractrix curve.

4. The powered airship according to claim 1, wherein the exterior shell comprises a lightweight, gas-retaining material.

5. The powered airship according to claim 4, wherein the gas-retaining material comprises a polyester film.

6. The powered airship according to claim 4, wherein the gas-retaining material comprises a transparent, lightweight, gas retaining film.

7. The powered airship according to claim 1, wherein the exterior shell comprises a substantially rigid material.

8. The powered airship according to claim 7, wherein the substantially rigid material comprises carbon fiber.

9. The powered airship according to claim 1, wherein the motor comprises an electrical motor powered by a battery and configured for driving a propeller.

10. The powered airship according to claim 9, wherein the battery is at least one of a fuel cell, an alkaline battery, a nickel cadmium battery, a lithium ion battery or a lithium polymer battery.

11. The powered airship according to claim 1, further comprising a solar array for providing electrical current to the motor.

12. The powered airship according to claim 1, wherein the motor is at least one of a rocket motor, a jet engine, a gasoline engine or a diesel engine.

13. The powered airship according to claim 1, further comprising a means for controlling speed, elevation and position of the powered airship remotely from the powered airship.

14. The powered airship according to claim 1, further configured for carrying a payload.

15. The powered airship according to claim 14, wherein the payload comprises at least one of scientific equipment, communications equipment or surveillance equipment.

16. The powered airship according to claim 14, wherein the payload is configured for transportation from one ground location to another ground location.

17. A solar-assisted, electrically powered airship, comprising:
   an exterior shell having a front portion, a rear portion and a main axis, the exterior shell configured with an aspect ratio greater than or equal to 9:1;
   a motor mount assembly mounted to the rear portion of the exterior shell;
   an electrical motor operably connected to the motor mount assembly;
   a propeller operably connected to the electrical motor;
   a battery configured for powering the electrical motor;
   a solar array configured for charging the battery; and
   wherein the motor mount assembly includes a first servo configured to rotate the propeller in a first plane about a first axis orthogonal to the main axis and a second servo configured to rotate the propeller and the first servo in a second plane about a second axis orthogonal to the main axis for articulating the propeller to provide thrust parallel to the main axis and in any direction up to 90° relative to the main axis.

18. The solar-assisted, electrically powered airship of claim 17, further comprising a flight controller in communication with the electrical motor and the motor mount assembly and configured for selectively controlling speed, altitude and position of the solar-assisted, electrically powered airship.

19. The solar-assisted, electrically powered airship of claim 18, further comprising a receiver in communication with the flight controller and including an antenna operably connected to the receiver for receiving remote control signals.

20. The solar-assisted, electrically powered airship of claim 17, further comprising a confined gas within the external shell for providing lift to the solar-assisted, electrically powered airship.

21. The solar-assisted, electrically powered airship of claim 17, wherein the exterior shell comprises a flexible transparent material.

22. The solar-assisted, electrically powered airship of claim 17, wherein the solar array is located inside the exterior shell.

23. The solar-assisted, electrically powered airship of claim 17, further comprising ballast located in the front portion of the exterior shell configured to counterbalance the solar-assisted, electrically powered airship.

24. The powered airship of claim 1, further comprising a connecting arm operably connecting the first servo and the second servo.

* * * * *